United States Patent
Takeuchi et al.

(10) Patent No.: US 9,512,922 B2
(45) Date of Patent: Dec. 6, 2016

(54) SEALING APPARATUS AND ENGINES

(75) Inventors: Don Takeuchi, Tempe, AZ (US); Nathan Gibson, Tempe, AZ (US); Tina Hynes, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2083 days.

(21) Appl. No.: 12/624,902

(22) Filed: Nov. 24, 2009

(65) Prior Publication Data
US 2011/0123329 A1 May 26, 2011

(51) Int. Cl.
F16J 15/32 (2016.01)
F01D 11/02 (2006.01)
F01D 11/00 (2006.01)

(52) U.S. Cl.
CPC .......... F16J 15/3288 (2013.01); F01D 11/001 (2013.01); F16J 15/3292 (2013.01); F01D 11/02 (2013.01); F05D 2240/56 (2013.01); F05D 2240/57 (2013.01)

(58) Field of Classification Search
USPC ....................................... 277/355
See application file for complete search history.

(56) References Cited

U.S. PATENT DOCUMENTS

| | | | |
|---|---|---|---|
| 5,031,922 A | 7/1991 | Heydrich | |
| 5,042,823 A | 8/1991 | Mackay et al. | |
| 5,108,116 A | 4/1992 | Johnson et al. | |
| 5,201,530 A | 4/1993 | Kelch et al. | |
| 5,335,920 A * | 8/1994 | Tseng et al. | 277/303 |
| 5,480,165 A | 1/1996 | Flower | |
| 5,630,590 A * | 5/1997 | Bouchard et al. | 277/301 |
| 5,704,760 A * | 1/1998 | Bouchard et al. | 415/170.1 |
| 5,755,445 A | 5/1998 | Arora | |
| 5,758,879 A * | 6/1998 | Flower | 277/303 |
| 6,053,699 A * | 4/2000 | Turnquist et al. | 415/231 |
| 6,196,550 B1 | 3/2001 | Arora et al. | |
| 6,364,316 B1 | 4/2002 | Arora | |
| 6,736,401 B2 | 5/2004 | Chung et al. | |
| 6,811,154 B2 | 11/2004 | Proctor et al. | |
| 7,578,509 B2 | 8/2009 | Grondahl | |
| 7,735,833 B2 * | 6/2010 | Braun et al. | 277/355 |
| 8,100,405 B2 * | 1/2012 | Kneeland et al. | 277/355 |
| 2003/0025274 A1 | 2/2003 | Allan et al. | |
| 2008/0122183 A1 | 5/2008 | Braun et al. | |

(Continued)

FOREIGN PATENT DOCUMENTS

WO 9214951 A1 9/1992

OTHER PUBLICATIONS

EP Search Report, EP 10175149.3-2421 dated Apr. 19, 2011.

(Continued)

*Primary Examiner* — Kristina Fulton
*Assistant Examiner* — Nicholas L Foster
(74) *Attorney, Agent, or Firm* — Lorenz & Kopf, LLP

(57) ABSTRACT

Sealing apparatus and engine are provided. A sealing apparatus includes a first cover plate, a second cover plate spaced apart from the first cover plate, and a sealing element disposed between the first cover plate and the second cover plate and including at least two diaphragm members, wherein a first diaphragm member has a first stiffness and a second diaphragm member has a second stiffness that is different than the first stiffness. The sealing apparatus may be disposed in an engine.

18 Claims, 7 Drawing Sheets

(56) References Cited

U.S. PATENT DOCUMENTS

2009/0087307 A1    4/2009  Takeuchi et al.

OTHER PUBLICATIONS

EP Communication, EP 10175149.3-2421 dated Jun. 5, 2011.
EP Communication, EP 10 175 149.3, dated May 31, 2012.
Braun, M.J., et al.; Some Numerical Simulations and an Experimental Investigation of Finger Seals; NASA Seal/Secondary Air Delivery Workshop; NASA/CP-2007-214995/vol. 1; Nov. 14-15, 2006.
Proctor, M.P, et al.; Preliminary Test Results of a Non-Contacting Finger Seal on a Herringbone-Grooved Rotor; NASA/TM-2008-215475, AIAA-2008-4506; Nov. 2008.

\* cited by examiner

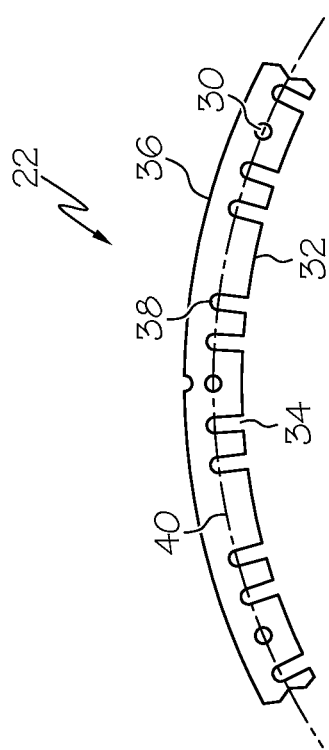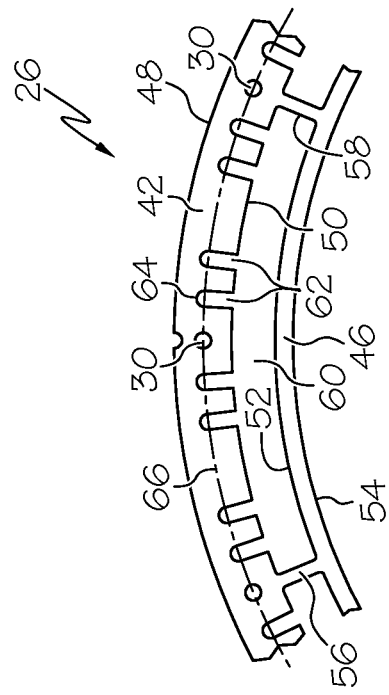

SEALING APPARATUS AND ENGINES

STATEMENT REGARDING FEDERALLY SPONSORED RESEARCH OR DEVELOPMENT

This invention was made with Government support under W911W6-08-2-0001 awarded by the United States Army. The Government has certain rights in this inventive subject matter.

TECHNICAL FIELD

The inventive subject matter generally relates to engines, and more particularly relates to sealing apparatus for use in engines.

BACKGROUND

Gas turbine engines employ sealing devices in various capacities in order to restrict a flow of fluid or gas from one portion of the engine to another. For example, sealing devices, such as finger seals, may be used to separate a primary engine flowpath from a secondary flowpath, where the primary engine flowpath directs the flow of gases to compressor and turbine stages of the engine, and the secondary flowpath delivers compressed air throughout the engine for performing a variety of functions. Leakage of compressed air from the secondary flowpath into the primary engine flowpath may adversely affect the performance of certain engine functions, such as the cooling of individual components, the provision of a bleed air source, the control of ventilation among engine cavities and structures, and the like. In another example, finger seals may be used to separate the secondary flowpath from engine cavities containing fluids such as lubricating oil, so that bleed air taken from the secondary flowpath does not contaminate air supplied to an aircraft's environmental control system. In this regard, sealing devices may be mounted adjacent to lubricated bearings and engine oil sumps.

Generally, finger seals comprise a plurality of diaphragm members, each having one end fixed to a stationary body of the engine and another end that sealingly engages a seal rotor. Each diaphragm member, which may be disk-shaped, includes a set of flexible members or fingers along its sealing perimeter. The fingers are integrally formed as part of the corresponding diaphragm members. The diaphragm members may be stacked to form laminates, and each set of fingers of each diaphragm member makes up a layer of fingers. To prevent leakage across the seal, two or more layers of fingers are relatively positioned such that gaps between fingers in one of the diaphragm members are blocked by the fingers of an adjacent diaphragm member.

The finger seal may form an inner diameter riding seal. In such case, during engine operation, the fingers deform in a generally radially outward direction due to various factors including centrifugal and thermal growth of the rotating surface. The reverse is true with a finger seal that forms an outer diameter riding seal. Here, centrifugal and thermal growth causes the rotor to move away from the seal. In order to maintain an effective seal in either design, the fingers restore themselves radially towards the rotating surface as it changes its size. However, as the demand for improved engine efficiency increases, engine speeds may increase resulting in an increase of pressure differential across the seal. As a result, fluid pressure acting on the radially deformed fingers may increase. Additionally, the fluid pressure distribution may cause increased pressure loading on one or more layers of fingers, which in turn can cause these higher loaded flexible members to experience greater deflection than flexible members from the adjacent layers of fingers. This difference in relative deflection between adjacent layers of fingers can cause gaps between individual fingers to shift relative to an overlapping finger of an adjacent layer of fingers. Due to this relative shift from one layer to the next, the gaps may not be suitably blocked by the fingers of the adjacent diaphragm member, and leakage may occur across the seal. Consequently, the effectiveness of the seal may be reduced.

Accordingly, it is desirable to have an improved sealing device for use between stationary and rotating surfaces. In addition, it is desirable for the sealing device to be relatively simple and inexpensive to manufacture. Moreover, it is desirable for the sealing device to be capable of being retrofitted into engines, which currently include conventional finger seals. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Sealing apparatus and engines are provided.

In an embodiment, by way of example only, a sealing apparatus includes a first cover plate, a second cover plate spaced apart from the first cover plate, and a sealing element disposed between the first cover plate and the second cover plate and including at least two diaphragm members, wherein a first diaphragm member has a first stiffness and a second diaphragm member has a second stiffness that is different than the first stiffness.

In another embodiment, by way of example only, an engine includes a stationary body, a seal rotor configured to rotate relative to the stationary body; and a sealing apparatus mounted to the stationary body to define a first cavity and a second cavity, the first cavity and the second cavity having different fluid pressures. The sealing apparatus includes a first cover plate mounted to the stationary body and extending toward the seal rotor, a second cover plate mounted to the stationary body and extending toward the seal rotor, the second cover plate spaced apart from the first cover plate, a sealing element disposed between the first cover plate and the second cover plate and including at least two diaphragm members, wherein a first diaphragm member has a first stiffness and a second diaphragm member has a second stiffness that is different than the first stiffness.

BRIEF DESCRIPTION OF THE DRAWINGS

The inventive subject matter will hereinafter be described in conjunction with the following drawing figures, wherein like numerals denote like elements.

FIG. 3 is a close up view of a portion of a first spacer of the sealing apparatus of FIG. 2, according to an embodiment;

FIG. 4 is a close up view of a portion of a second spacer of the sealing apparatus of FIG. 2, according to an embodiment;

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
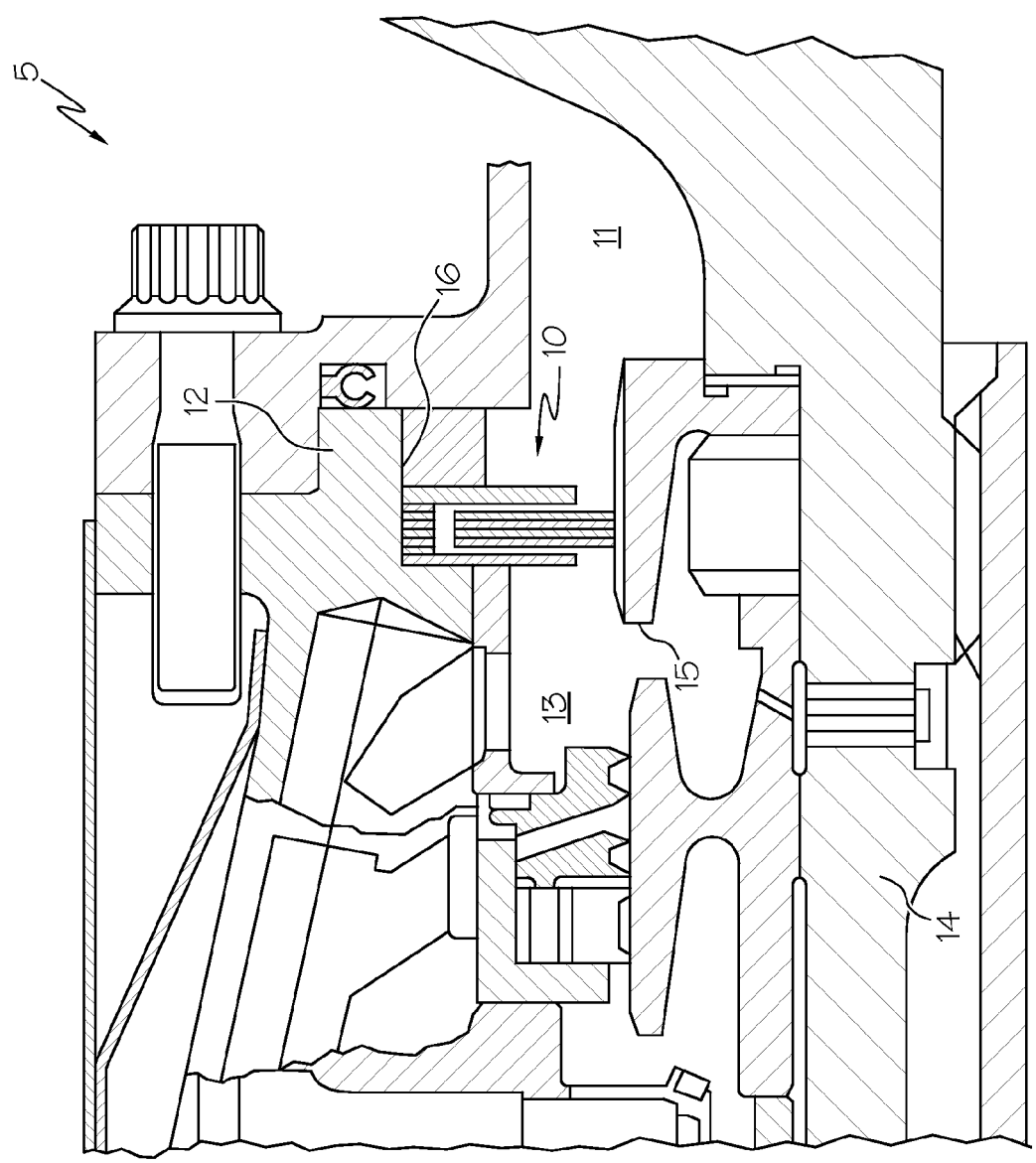
FIG. 1 is an axi-symmetric, cross-sectional view of an upper half of a portion of a gas turbine engine including a sealing apparatus, according to an embodiment.

FIG. 1 is an axi-symmetric, cross-sectional view of an upper half of a portion of a gas turbine engine 5 including a sealing apparatus 10, according to an embodiment. The gas turbine engine 5 includes a stationary body 12 and a seal rotor 15, which is mounted to a rotatable shaft 14. The stationary body 12 defines a bore 16 through which the rotatable shaft 14 and seal rotor 15 extend. The sealing apparatus 10 is mounted onto the stationary body 12 to define a first cavity 11 and a second cavity 13. The second cavity 13 has a different fluid pressure than the first cavity 11, and inclusion of the sealing apparatus 10 prevents fluid communication between the cavities 11, 13. According to an embodiment, the first cavity 11 may have a greater fluid pressure than the second cavity 13. In other embodiments, the fluid pressure of the second cavity 13 may be greater than that of the first cavity 11. In any case, the sealing apparatus 10 encircles and contacts the seal rotor 15 to provide a rotatable seal.

Figure 2:
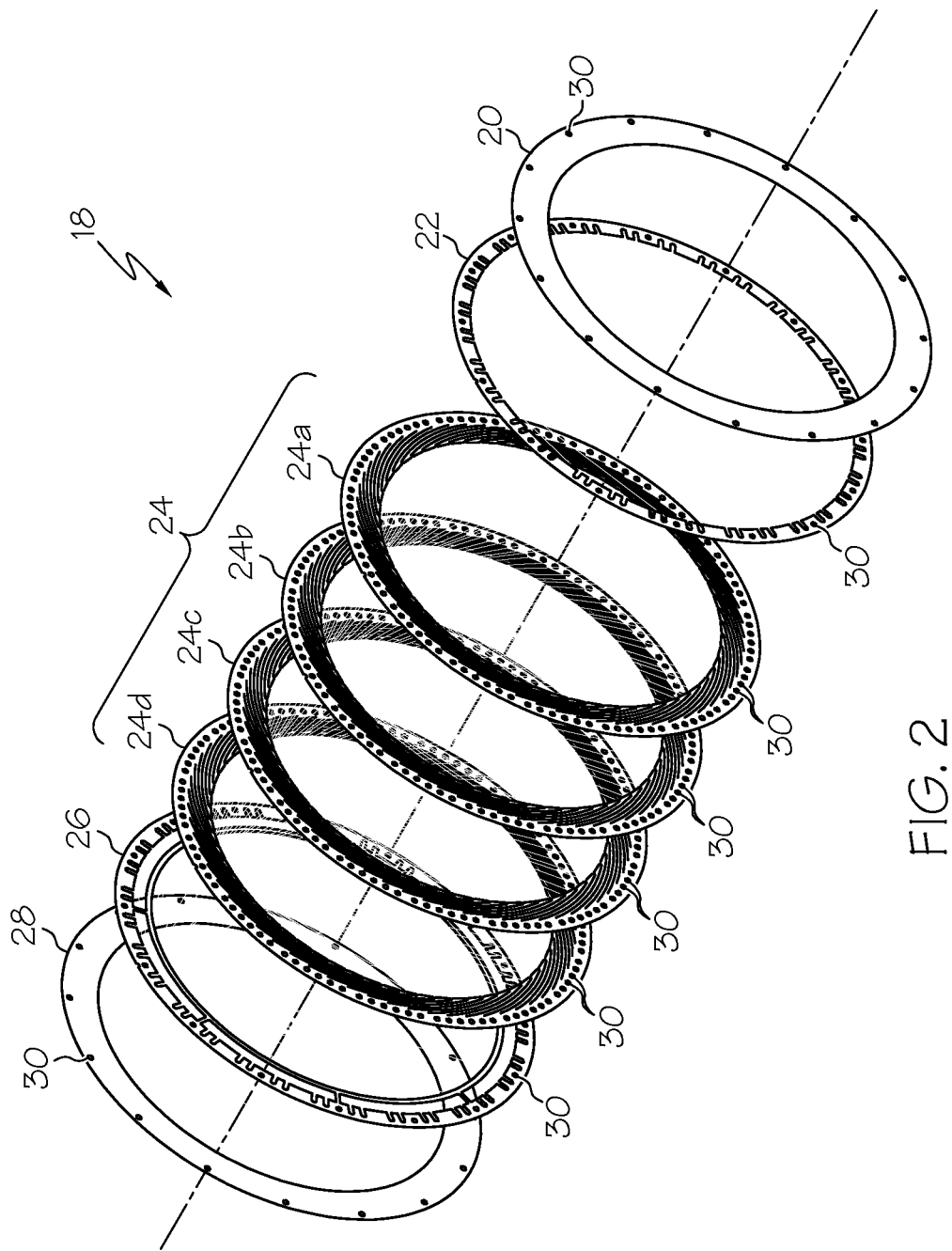
FIG. 2 is an exploded view of a sealing apparatus, according to an embodiment.

FIG. 2 is an exploded view of a sealing apparatus 18, according to an embodiment. The sealing apparatus 18 may be implemented into the gas turbine engine 5 of FIG. 1 and includes a first cover plate 20, a first spacer 22, a sealing element 24, a second spacer 26, and a second cover plate 28, in an embodiment. The cover plates 20, 28 are configured to be mounted to the stationary body 12 (FIG. 1) and to extend radially inward toward the seal rotor 15 (FIG. 1) or another rotating component. In an embodiment, a first cover plate 20 may be configured to define a portion of the first cavity 11 of FIG. 1, and the second cover plate 28 may be configured to define a portion of the second cavity 13 of FIG. 1. In accordance with an embodiment, the cover plates 20, 28 may be substantially identically configured and dimensioned. Each of the cover plates 20, 28 has a diameter in a range of about 8.5 to about 28 cm and a thickness in a range of about 1.0 to about 1.8 mm. In other embodiments, the diameters and/or thicknesses of the cover plates 20, 28 may be greater or less than the aforementioned ranges and/or one cover plate 20, 28 may be larger than the other cover plate 20, 28.

The sealing element 24 is disposed between the cover plates 20, 28 and includes one or more diaphragm members (e.g., a first outer diaphragm member 24a, inner diaphragm members 24b and 24c, and a second outer diaphragm member 24d), in an embodiment. The diaphragm members 24a, 24b, 24c, 24d may be substantially identically (e.g., ±0.05 mm) dimensioned, in an embodiment. In an embodiment, each of the diaphragm members 24a, 24b, 24c, 24d has a diameter in a range of about 6 to about 24 cm and a thickness in a range of about 0.35 mm to about 0.70 mm. In other embodiments, the diameters and/or thicknesses of the diaphragm members 24a, 24b, 24c, 24d may be greater or less than the aforementioned ranges. However, two or more of the diaphragm members 24a, 24b, 24c, 24d may have different stiffnesses. For example, diaphragm member 24a may have a stiffness that is greater than that of diaphragm member 24b and/or diaphragm member 24d. In another example, the stiffnesses of the successive diaphragm members 24a, 24b, 24c, 24d decrease. In still another example, the stiffnesses of successive diaphragm members 24a, 24b, 24c, 24d may increase or decrease from member to member. The particular stiffness of the each diaphragm member 24a, 24b, 24c, 24d may depend on a pressure differential across the sealing apparatus 18 and centrifugal growth of the seal runner. The desired stiffness may be calculated using an estimated deflection due to pressure loading that results from the pressure differential. In accordance with an embodiment, four diaphragm members 24a, 24b, 24c, 24d are included. Alternatively, in other embodiments, fewer or more than four diaphragm members may be included.

The first and second spacers 22, 26 are each disposed between a cover plate 20 and a diaphragm member 24a, 24d. The first and second spacers 22, 26 may be substantially identically configured and dimensioned. In an embodiment, each of the first and second spacers 22, 26 has a diameter in a range of about 6 to about 24 cm and a thickness in a range of about 0.35 mm to about 0.70 mm. In other embodiments, the diameters and/or thicknesses of the first and second spacers 22, 26 may be greater or less than the aforementioned ranges. A plurality of circumferentially spaced rivet holes 30 are included at outer peripheral locations on each of the plates, spacers and diaphragm members 20, 22, 24, 26, 28. Rivets (not shown) may be mounted through the rivet holes 30 to hold the plates, spacers and diaphragm members together. Alternatively, in other embodiments the features of the spacers 22, 26 may be incorporated into the cover plates 20 and 28. In this case, the spacers 22 and 26 may be omitted.

FIG. 3 is a close up view of a portion of the first spacer 22 of the sealing apparatus 18 of FIG. 2, according to an embodiment. As alluded to above, the first spacer 22 is annular and may comprise Haynes 25 material. In an embodiment, suitable materials include, but are not limited to Inconel 718, other metals or ceramic materials. The first spacer 22 has an inner edge 32 defining an inner diameter, which may be in a range of about 6.3 cm to about 24.8 cm, in an embodiment. In other embodiments, the inner diameter may be greater or less than the aforementioned range. A plurality of radial passages 34 is formed circumferentially around the first spacer 22, and the radial passages 34 extend radially outwardly from the inner edge 32 of the first spacer 22 toward an outer edge 36 to define radial outer ends 38. Each radial passage 34 may have substantially equal (e.g., ±0.05 mm) radial lengths, in an embodiment. In other embodiments, the radial passages 34 may vary in radial length. In any case, the radial lengths of the radial passage 34 may be in a range of about 2.5 mm to about 7 mm. In other embodiments, the radial lengths may be longer or shorter than the aforementioned range.

In accordance with an embodiment, the radial outer ends 38 are circumferentially aligned along the first spacer 22 such that a diameter defined by the circumferential alignment is greater than a diameter of an alignment ring defined by dotted circle 40. The alignment ring 40 is used to align the openings formed by the radial outer ends 38 of the first spacer 22 with corresponding openings in the diaphragm members 24 and the second spacer 26, as will be discussed in more detail below. In an embodiment, the alignment ring 40 may be located substantially halfway between the inner and outer edges 32, 36 of the first spacer 22. In other embodiments, the alignment ring 40 may be located more radially outward or inward. According to an embodiment, rivet holes 30 may be aligned along the alignment ring 40. In other embodiments, the rivet holes 30 may be located radially inward or radially outward relative to the alignment ring 40 depending on the locations of the rivets holes 30 of the second spacer 26 and those of the diaphragm members 24.

FIG. 4 is a close up view of a portion of the second spacer 26 of the sealing apparatus 18 of FIG. 2, according to an embodiment. The second spacer 26 may comprise Haynes 25 material. In an embodiment, suitable materials include, but are not limited to Inconel 718, other metals, or ceramic materials. The second spacer 26 includes an outer ring portion 42 and an inner ring portion 46. The outer ring portion 42 has an outer edge 48 having a diameter in a range of about 8.5 cm to about 28 cm and an inner edge 50 having a diameter in a range of about 6.3 cm to about 24.8 cm, in an embodiment. In another embodiment, the inner ring portion 46 is configured to serve as a seal and has an outer edge 52 having a diameter in a range of about 6.2 cm to about 24.5 cm and an inner edge 54 having a diameter in a range of about 6 cm to about 24 cm, in an embodiment. In other embodiments, the outer and inner diameters of the ring portions 42, 46 may be greater or less than the aforementioned ranges.

The two ring portions 42, 46 may be attached together by radially-extending walls 56, 58. The radially-extending walls 56, 58 may be substantially identical to each other and may have radial lengths in a range of about 0.35 to about 1.2 cm, in an embodiment. In another embodiment, the radially-extending walls 56, 58 may have widths in a range of about 1.25 mm to about 4 mm. In still other embodiments, the radial lengths and/or widths of the radially-extending walls 56, 58 may be larger or smaller than the aforementioned ranges and/or the radially-extending walls 56, 58 may not be identical in configuration and dimension to each other. In an embodiment, the inner edge 50 of the outer ring portion 42, the outer edge 52 of the inner ring portion 46, and the radially-extending walls 56, 58 define a flow opening 60. In accordance with an embodiment, eight flow openings 60 are disposed circumferentially around the second spacer 26. In alternate embodiments, fewer or more flow openings 60 and hence, a corresponding number of radially-extending walls 56, 58, may be included in the second spacer 26.

Each of these flow openings 60 fluidly communicates with radial passages 62 that extend radially outwardly from the inner edge 50 of the outer ring portion 42 part ways to the outer edge 48. The radial passages 62 may be disposed in pairs around the outer ring portion 42, in an embodiment. For example, a distance between two radial passages 62 of a pair may be in a range of about 2.5 to about 10 mm, and a distance between two radial passages 62 of different pairs may be in range of about 7 to about 25 mm. The pairs of radial passages may be disposed relatively uniformly around the outer ring portion 42, in an embodiment, but may not be in other embodiments. In still other embodiments, all of the radial passages 62 may be disposed substantially uniformly (e.g., ±0.05 mm) around the outer ring portion 42, or may be grouped together in groups greater than two.

Radial outer ends 64 of the radial passages 62 are circumferentially aligned along the second spacer 26 such that a diameter defined by the circumferential alignment is greater than a diameter of an alignment ring defined by dotted circle 66. The alignment ring 66 is used to align the openings formed by the radial outer ends 64 of the second spacer 26 with corresponding openings in the diaphragm members 24 (as will be discussed in more detail below) and the first spacer 22. In an embodiment, the alignment ring 66 may substantially equal (e.g., ±0.05 mm) in diameter to the alignment ring 40 of the first spacer 22. According to another embodiment, the alignment ring 66 may be located substantially halfway between the outer and inner edges 48, 50 of the outer ring portion 42. In still other embodiments, the alignment ring 66 may be located more radially outward or inward. Although eight radial passages 62 are illustrated as being in communication with one flow opening 60, the number of radial passages per flow opening may vary in different embodiments. According to an embodiment, rivet holes 30 may be aligned along the alignment ring 66 also. In other embodiments, the rivet holes 30 may be located radially inward or radially outward relative to the alignment ring 66 depending on the locations of the rivet holes 30 of the first spacer 22 and those of the diaphragm members 24.

Figure 5:
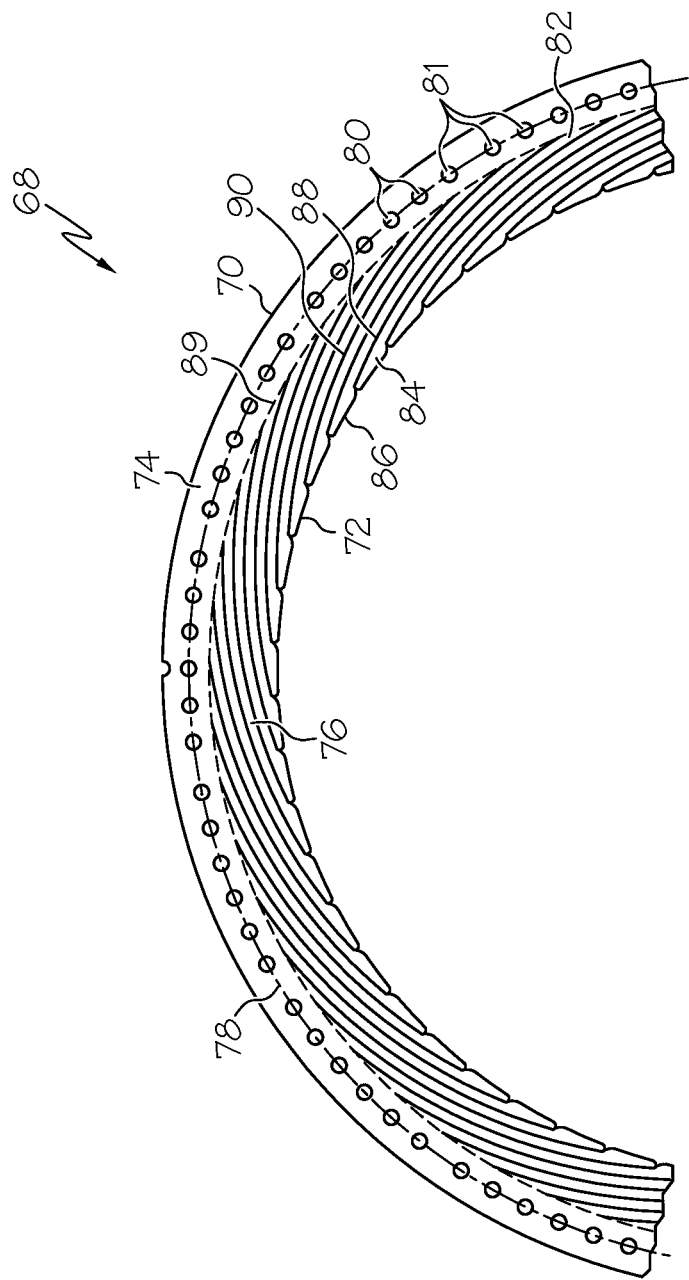
FIG. 5 is a close up view of a portion of a diaphragm member that may be employed in the sealing apparatus of FIG. 2, according to an embodiment.

FIG. 5 is a close up view of a portion of a diaphragm member 68 that may be implemented as part of the sealing element 24 of FIG. 2, according to an embodiment. The diaphragm member 68 is annular and has an outer diameter edge 70, an inner diameter edge 72. The diaphragm member 68 may be formed from a metallic Haynes 25 material. Suitable materials include, but are not limited to, Inconel 718. In an embodiment, the diaphragm member 68 has an outer diameter that is in a range of about 8.5 to about 28 cm, an inner diameter in a range of about 6 cm to about 24 cm, and a thickness in a range of about 0.35 mm to about 0.70 mm. In other embodiments, the diameters and/or thickness may be greater or less than the aforementioned ranges, depending on particular dimensions of the other components of the sealing apparatus 18 and surrounding engine components.

According to an embodiment, the diaphragm member 68 includes a band portion 74 and a plurality of fingers 76. The band portion 74 is defined, in part, by the outer diameter edge 70, and the plurality of fingers 76 is disposed circumferentially uniformly around the diaphragm member 68. In accordance with an embodiment, the band portion 74 may be circumferentially continuous, but may include flow openings 81. In an embodiment, the flow openings 81 are disposed circumferentially along alignment ring 78. The alignment ring 78 is used to align the flow openings 81 with the openings formed through the second spacer 26 and the first spacer 22. In an embodiment, the alignment ring 78 may be substantially equal in diameter to the alignment rings 40, 66 of the spacers 22, 26. According to another embodiment, the alignment ring 78 may be located substantially halfway between the outer diameter edge 70 and plurality of fingers 76. In still other embodiments, the alignment ring 78 may be located more radially outward or inward.

The flow openings 81 may be uniformly spaced around the alignment ring 78 in an embodiment. In another embodiment, the flow openings 81 may be grouped together in pairs or multiples. In still another embodiment, the flow openings 81 may not be uniformly spaced. The positioning of the flow openings 81 may depend on locations of the radial passages 34, 62 of the first and second spacers 22, 26 of other components of sealing apparatus 18. According to an embodiment, the flow openings 81 may be substantially identical in configuration. In other embodiments, the openings 81 may not be identical. In an embodiment, the flow openings 81 may have diameters in a range of about 1.5 mm to about 3.0 mm. However in alternate embodiments, the flow openings 81 may be larger or smaller than the aforementioned range. Additionally, in other embodiments the flow openings may have a non-circular shape.

Rivet holes 80 may also be disposed circumferentially at a diameter indicated by alignment ring 78. The rivet holes 80 may or may not be substantially identical in configuration. In an embodiment, the rivet holes 80 may have diameters in a range of about 1.5 mm to about 3.0 mm. However in alternate embodiments, the rivet holes 80 may be larger or smaller than the aforementioned range. Positioning of the rivet holes 80 may depend on locations of rivets holes of other components of sealing apparatus 18. In some embodiments, the rivet holes 80 may be interspersed between the flow openings 81. In other embodiments, the rivet holes 80 may be positioned radially outward or radially inward relatively to the flow openings 81.

Each finger of the plurality of fingers 76 extends from an outer end 82 radially inwardly from the band portion 74 to an inner end 84. The plurality of fingers 76 may be circumferentially uniformly arrayed. In an embodiment, to provide additional structural integrity to the inner diameter edge 72 of the diaphragm member 68, each finger may include a foot portion 86 that is relatively thicker than a finger portion 88 of the finger. The finger portions 88 are circumferentially spaced apart to define a plurality of uniform gaps 90. According to an embodiment, each finger portion 88 has substantially identical thicknesses, and the gaps 90 are substantially identical in width. In another embodiment, the gaps 90 are narrower in width than the finger portions 88 are in thickness. For example, the thickness of each finger portion 88 may be in a range of about 1.0 mm to about 3.0 mm, and the width of each gap 90 may be in a range of about 0.35 mm to about 0.70 mm. In this way, the combination of the band portion 74, the finger portions 88, and the gaps 90 give the diaphragm members 68 a comb-like configuration. In other embodiments, the thicknesses and widths may be greater or less than the aforementioned range as long as the comb-like configuration is maintained. In other embodiments, each finger 76 may not include a foot portion 86.

As noted above, the diaphragm member 68 has a particular stiffness. In an embodiment, to provide a particular stiffness, each finger 76 may have identical radii of curvature between the outer end 82 and the inner end 84, in an embodiment. For example, the fingers 76 may be curved such that each has a radius of curvature that is substantially identical to the radius of curvature of an adjacent finger on the diaphragm member 68. As used herein, the term "radius of curvature" may be measured by the distance from an arc defined by the center of the gap between the flexible members to a point that is equidistant from all points on that arc. In an embodiment, the radius of curvature of the fingers 76 may be in a range of about 5 cm to about 7.5 cm. In other embodiments, the radius of curvature may be greater or less than the aforementioned range. While the curvature can be used to adjust finger stiffness, the relative curvature from diaphragm member to diaphragm member is preferably maintained to provide continuous overlapping contact between adjacent diaphragm members.

Figure 6:
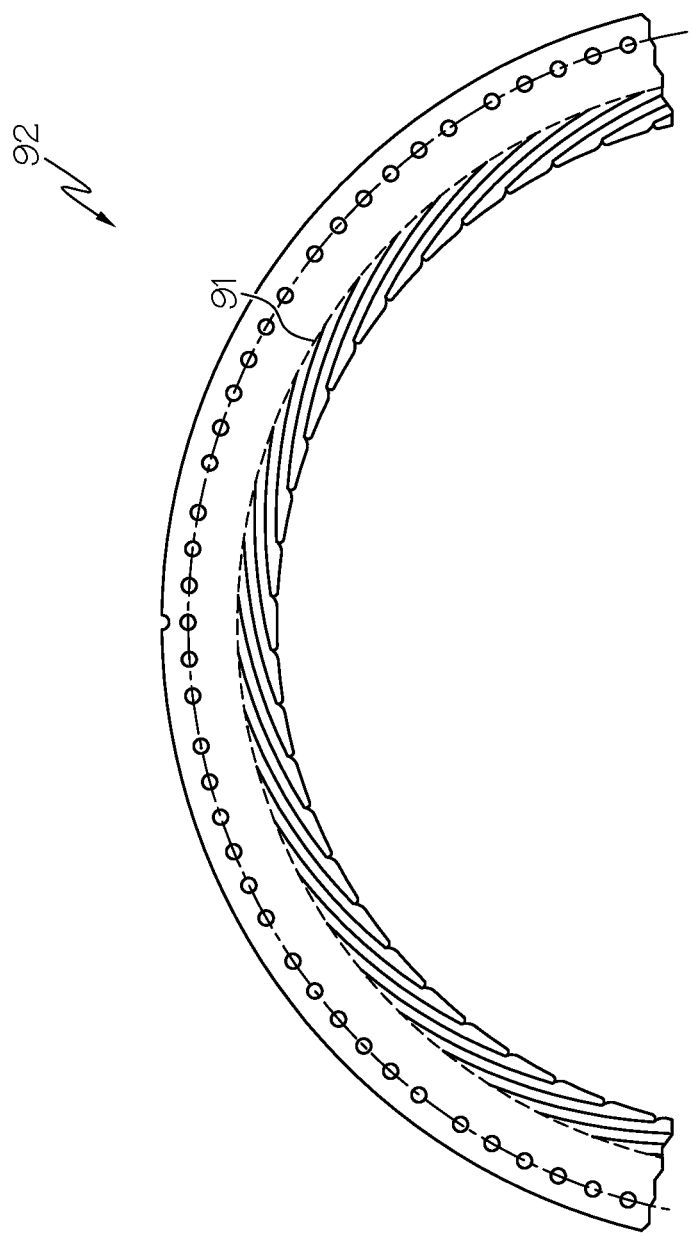
FIG. 6 is a close up view of a portion of a diaphragm member that may be employed in the sealing apparatus of FIG. 2, according to another embodiment.

To vary the stiffness from diaphragm member to diaphragm member, one diaphragm member (e.g., diaphragm member 24a of FIG. 2) may have fingers having a first arc length, and another diaphragm member (e.g., member 24b of FIG. 2) may have fingers having a second arc length. For example, by including fingers on a first diaphragm member having a first arc length that is greater than a second arc length of fingers on a second diaphragm member, the stiffness of the first diaphragm member may be less than the stiffness of the second diaphragm member FIG. 6 is a close up view of a portion of a diaphragm member 92 that may be implemented as part of the sealing element 24 of FIG. 2, according to another embodiment. With reference to FIGS. 5 and 6, in an embodiment, arc length may be varied by including a first diaphragm member 68 with a first finger outer end diameter (indicated by dotted curve 89), a second diaphragm member 92 with a second finger outer end diameter (indicted by dotted curve 91) that is not equal to that of the first finger outer end diameter 89. For example, the first finger outer end diameter 89 may be in a range of about 3.8 cm to about 12.7 cm, and the second finger outer end diameter 91 may be smaller than the diameter of first outer diameter by a range of about 0.13 cm to about 1.3 cm. In other embodiments, the outer end diameters and the difference between the two may be greater or less than the aforementioned ranges.

Figure 7:
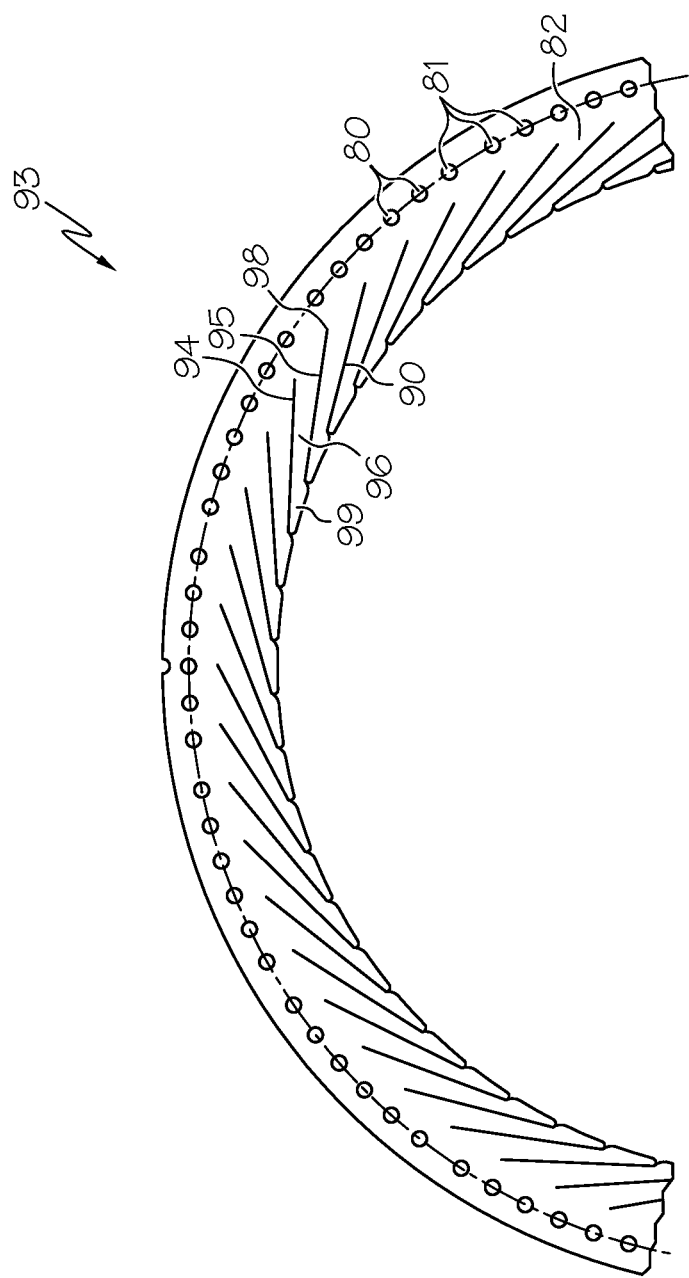
FIG. 7 is a close up view of a portion of a diaphragm member that may be employed in the sealing apparatus of FIG. 2, according to still another embodiment.

FIG. 7 is a close up view of a portion of a diaphragm member 93 that may be implemented into the sealing element 24 of FIG. 2, according to another embodiment. Here, each finger 96 does not have curvature and is defined by two walls 94, 95. In this way, the finger 96 has a particular length between its outer end 98 its inner end 99. In an embodiment, the lengths of the fingers 94 may be in a range of about 5.0 cm to about 7.5 cm. In other embodiments, the lengths may be greater or less than the aforementioned range. To vary the stiffness from diaphragm member to diaphragm member, one diaphragm member (e.g., diaphragm member 24a of FIG. 2) may have fingers having a first length, and another diaphragm member (e.g., member 24b of FIG. 2) may have fingers having a second length. For example, by including fingers on a first diaphragm member having a first length that is greater than a second length of fingers on a second diaphragm member, the stiffness of the first diaphragm member may not be as stiff as the second diaphragm member. In another embodiment, stiffness may be varied by varying the thicknesses of adjacent diaphragm members. For example, the first diaphragm member may be thicker than the second diaphragm or vice versa. In still another embodiment, adjacent diaphragm members may comprise different material. In an embodiment, the first diaphragm member may be formed of a first material, while the second, adjacent diaphragm member may comprise a second material that is not as stiff as the first material. In other embodiment, different materials may be employed and/or the first material may not be as stiff as the second material.

According to another embodiment, stiffness may be varied by forming one diaphragm member (e.g., diaphragm member 24a of FIG. 2) with fingers having a first radius of curvature and forming another diaphragm member (e.g., member 24b of FIG. 2) with fingers having a second radius of curvature. For example, by including fingers on a first diaphragm member having a first radius of curvature that is greater than a second radius of curvature of fingers on a second diaphragm member, the stiffness of the first diaphragm member may be less than the stiffness of the second diaphragm member. In still another embodiment, stiffness of each diaphragm member may be varied by employing different materials for two or more adjacent diaphragm members.

Returning to FIG. 2, the diaphragm members 24a, 24b, 24c, 24d are positioned to prevent leakage through the gaps 90 (FIG. 7). In this regard, each successive diaphragm member is clocked or rotated relative to a preceding diaphragm member. For example, the gaps 90 in diaphragm member 24*a* are blocked by the fingers of diaphragm member 24*b*, and the gaps 90 in diaphragm 24*b* are blocked by the fingers of diaphragm 24*c*.

Figure 8:
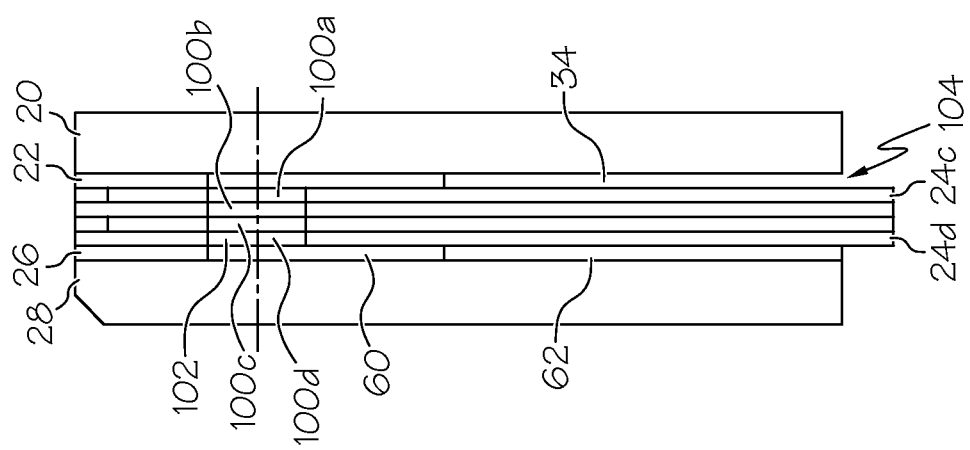
FIG. 8 is a side, cross-sectional view of the sealing apparatus of FIG. 2 in a stacked configuration and taken along a first radial location, according to an embodiment.

FIG. 8 is a side, cross-sectional view of the sealing apparatus of FIG. 2 in a stacked configuration and taken along a first radial location, according to an embodiment. When stacked, flow openings 100*a*, 100*b*, 100*c*, 100*d* of each of the diaphragm members 24*a*, 24*b*, 24*c*, 24*d* along with the upper portions of radial passages 34 and radial passages 62 define a plurality of axial passages 102 (only one of which is shown in FIG. 8). Thus, the sealing apparatus is configured so that high pressure air represented by arrow 104 flows radially outward between the first cover plate 20 and the diaphragm member 24*a*, through the radial passages 34, through the axial passages 102, through the radial passages 62 and then into flow openings 60. The inner ring portion 46 serves as a dam to seal the flow openings 60 from a low pressure side of the sealing apparatus. When implemented into an engine, the ends of the diaphragm members 24*a*, 24*b*, 24*c*, 24*d* cooperatively define the inner diameter of the sealing element 24, which is slightly less than an outer diameter of rotor 15 (FIG. 1). Consequently, when the diaphragm members 24*a*, 24*b*, 24*c*, 24*d* are received about the rotating rotor 15, a running interference is created between inner edges of the diaphragm members 24*a*, 24*b*, 24*c*, 24*d* and the outer surface of the rotor 15. This interference causes each of the diaphragm members 24*a*, 24*b*, 24*c*, 24*d* to slightly deflect which in turn cause the inner edges of the diaphragm members 24*a*, 24*b*, 24*c*, 24*d* to lightly press against the outer surface of rotor 15. Because the stiffness of the diaphragm members 24*a*, 24*b*, 24*c*, 24*d* is varied across the sealing apparatus, pressure loads on each diaphragm member 24*a*, 24*b*, 24*c*, 24*d* may be equalized. As a result, wear on the diaphragm members 24*a*, 24*b*, 24*c*, 24*d* may be reduced. This reduced wear extends the usable life of the seal and prevents certain fingers experiencing high pressure loading from causing high heat generation due to large contact forces with the rotor. It will be appreciated that although the sealing apparatus is depicted as an inner diameter riding seal, the sealing apparatus may be implemented as an outer diameter riding seal in other embodiments.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A sealing apparatus comprising:
a first cover plate;
a second cover plate spaced apart from the first cover plate; and
a sealing element disposed between the first cover plate and the second cover plate and including at least two diaphragm members, wherein a first diaphragm member has a first stiffness and a second diaphragm member has a second stiffness that is different than the first stiffness.

2. The sealing apparatus of claim 1, wherein:
the first diaphragm member includes a first outer diameter edge, a first inner diameter edge, a first band portion, and a first plurality of fingers, the first band portion is defined, in part, by the first outer diameter edge, and the first plurality of fingers is disposed circumferentially uniformly around the first diaphragm member and extends radially inwardly from the first band portion toward the first inner diameter edge;
the second diaphragm member includes a second outer diameter edge, a second inner diameter edge, a second band portion, and a second plurality of fingers, the second band portion is defined, in part, by the second outer diameter edge, and the second plurality of fingers is disposed circumferentially uniformly around the second diaphragm member and extends radially inwardly from the second band portion toward the second inner diameter edge;
a total number of fingers of the first plurality of fingers and a total number of fingers of the second plurality of fingers are equal to each other;
a first finger outer end diameter of the first diaphragm member and a second finger outer end diameter of the second diaphragm member are not equal; and
an inner diameter of the first diaphragm member and an inner diameter of the second diaphragm member are substantially equal.

3. The sealing apparatus of claim 1, wherein:
the first diaphragm member includes a first outer diameter edge, a first inner diameter edge, a first band portion, and a first plurality of fingers, the first band portion is defined, in part, by the first outer diameter edge, and the first plurality of fingers is disposed circumferentially uniformly around the first diaphragm member and extends radially inwardly from the first band portion toward the first inner diameter edge;
the second diaphragm member includes a second outer diameter edge, a second inner diameter edge, a second band portion, and a second plurality of fingers, the second band portion is defined, in part, by the second outer diameter edge, and the second plurality of fingers is disposed circumferentially uniformly around the second diaphragm member and extends radially inwardly from the second band portion toward the second inner diameter edge;
each finger of the first plurality of fingers is substantially identical in configuration and has a first outer end, a first inner end, and a first length measured from the first outer end to the first inner end,
each finger of the second plurality of fingers are substantially identical in configuration and has a second outer end, a second inner end, and a second length measured from the second outer end to the second inner end, and
the second length is not equal to the first length.

4. The sealing apparatus of claim 1, wherein a plurality of uniform gaps are formed between each finger of the first plurality of fingers, and each gap is narrower than each finger.

5. The sealing apparatus of claim 1, wherein:
the first diaphragm member includes a first outer diameter edge, a first inner diameter edge, a first band portion, and a first plurality of fingers, the first band portion is defined, in part, by the first outer diameter edge, and the first plurality of fingers is disposed circumferentially uniformly around the first diaphragm member and extends radially inwardly from the first band portion toward the first inner diameter edge;

the second diaphragm member includes a second outer diameter edge, a second inner diameter edge, a second band portion, and a second plurality of fingers, the second band portion is defined, in part, by the second outer diameter edge, and the second plurality of fingers is disposed circumferentially uniformly around the second diaphragm member and extends radially inwardly from the second band portion toward the second inner diameter edge;

the first diaphragm member and the second diaphragm member are adjacent to each other;

a first plurality of uniform gaps are formed between each finger of the first plurality of fingers, a second plurality of uniform gaps are formed between each finger of the second plurality of fingers, and the first diaphragm member is clocked relative to the second diaphragm member such that each gap of the first plurality of uniform gaps in the first diaphragm member is at least partially blocked by a finger of the second plurality of fingers of the second diaphragm member.

6. The sealing apparatus of claim 1, further comprising:
a first spacer disposed between the first cover plate and the sealing element; and
a second spacer disposed between the second cover plate and the sealing element.

7. The sealing apparatus of claim 1, wherein:
the at least two diaphragm members include a first outer diaphragm member, a second outer diaphragm member, and inner diaphragm members disposed between the first outer diaphragm member and the second outer diaphragm member, and
stiffnesses of each successive diaphragm member decreases from the first outer diaphragm member to the second outer diaphragm member.

8. The sealing apparatus of claim 1, wherein:
the at least two diaphragm members include a first outer diaphragm member, a second outer diaphragm member, and at least one inner diaphragm member disposed between the first outer diaphragm member and the second outer diaphragm member,
the first stiffness of the first outer diaphragm member is greater than the second stiffness of at least one of the at least one inner diaphragm member; and
a third stiffness of at least one of the at least one inner diaphragm members is less than a fourth stiffness of the second outer diaphragm member.

9. The sealing apparatus of claim 8, wherein the second stiffness and the third stiffness originate from a single inner diaphragm member.

10. The sealing apparatus of claim 8, wherein the second stiffness and the third stiffness originate from a first inner diaphragm member and a second inner diaphragm member, respectively.

11. An engine comprising:
a stationary body;
a seal rotor configured to rotate relative to the stationary body; and
a sealing apparatus mounted to the stationary body to define a first cavity and a second cavity, the first cavity and the second cavity having different fluid pressures, the sealing apparatus including:

a first cover plate mounted to the stationary body and extending toward the seal rotor;
a second cover plate mounted to the stationary body and extending toward the seal rotor, the second cover plate spaced apart from the first cover plate; and
a sealing element disposed between the first cover plate and the second cover plate and including at least two diaphragm members, wherein a first diaphragm member has a first stiffness and a second diaphragm member has a second stiffness that is different than the first stiffness.

12. The engine of claim 11, wherein:
the first cavity has a fluid pressure that is greater than a fluid pressure of the second cavity;
the first cover plate defines a portion of the first cavity; and
the second cover plate defines a portion of the second cavity.

13. The engine of claim 12, wherein:
the first diaphragm member includes a first outer diameter edge, a first inner diameter edge, a first band portion, and a first plurality of fingers, the first band portion is defined, in part, by the first outer diameter edge, and the first plurality of fingers is disposed circumferentially uniformly around the first diaphragm member and extends radially inwardly from the first band portion toward the first inner diameter edge;

the second diaphragm member includes a second outer diameter edge, a second diameter edge, a second band portion, and a second plurality of fingers, the second band portion is defined, in part, by the second outer diameter edge, and the second plurality of fingers is disposed circumferentially uniformly around the second diaphragm member and extends radially inwardly from the second band portion toward the second inner diameter edge;

a total number of fingers of the first plurality of fingers and a total number of fingers of the second plurality of fingers are equal to each other;

a first finger outer end diameter of the first diaphragm member and a second finger outer end diameter of the second diaphragm member are not equal; and an inner diameter of the first diaphragm member and an inner diameter of the second diaphragm member are substantially equal.

14. The engine of claim 13, wherein:
each finger of the first plurality of fingers is substantially identical in configuration and has a first outer end, a first inner end, and a first length measured from the first outer end to the first inner end,
each finger of the second plurality of fingers are substantially identical in configuration and has a second outer end, a second inner end, and a second length measured from the second outer end to the second inner end, and
the second length is not equal to the first length.

15. The engine of claim 13, wherein:
the first diaphragm member and the second diaphragm member are adjacent to each other;
a first plurality of uniform gaps are formed between each finger of the first plurality of fingers,
a second plurality of uniform gaps are formed between each finger of the second plurality of fingers, and
the first diaphragm member is clocked relative to the second diaphragm member such that each gap of the first plurality of uniform gaps in the first diaphragm member is at least partially blocked by a finger of the second plurality of fingers of the second diaphragm member.

16. The engine of claim 13, further comprising:
a first spacer disposed between the first cover plate and the sealing element; and
a second spacer disposed between the second cover plate and the sealing element.

17. The engine of claim 11, wherein:
the at least two diaphragm members include a first outer diaphragm member, a second outer diaphragm member, and inner diaphragm members disposed between the first outer diaphragm member and the second outer diaphragm member, and
a stiffness of each successive diaphragm member decreases from the first outer diaphragm member to the second outer diaphragm member.

18. The engine of claim 11, wherein:
the at least two diaphragm members include a first outer diaphragm member, a second outer diaphragm member, and inner diaphragm members disposed between the first outer diaphragm member and the second outer diaphragm member, and
the first stiffness of the first outer diaphragm member is greater than the second stiffness of at least one of the inner diaphragm members and a third stiffness of at least one of the inner diaphragm members is less than a fourth stiffness of the second outer diaphragm member.

* * * * *